Aug. 31, 1954  G. E. MALLINCKRODT  2,687,609
ROTARY EXPANSION ENGINE
Filed Sept. 8, 1950  6 Sheets-Sheet 1

George E. Mallinckrodt,
Inventor,
Haynes and Koenig,
Attorneys.

Aug. 31, 1954  G. E. MALLINCKRODT  2,687,609
ROTARY EXPANSION ENGINE
Filed Sept. 8, 1950  6 Sheets-Sheet 2
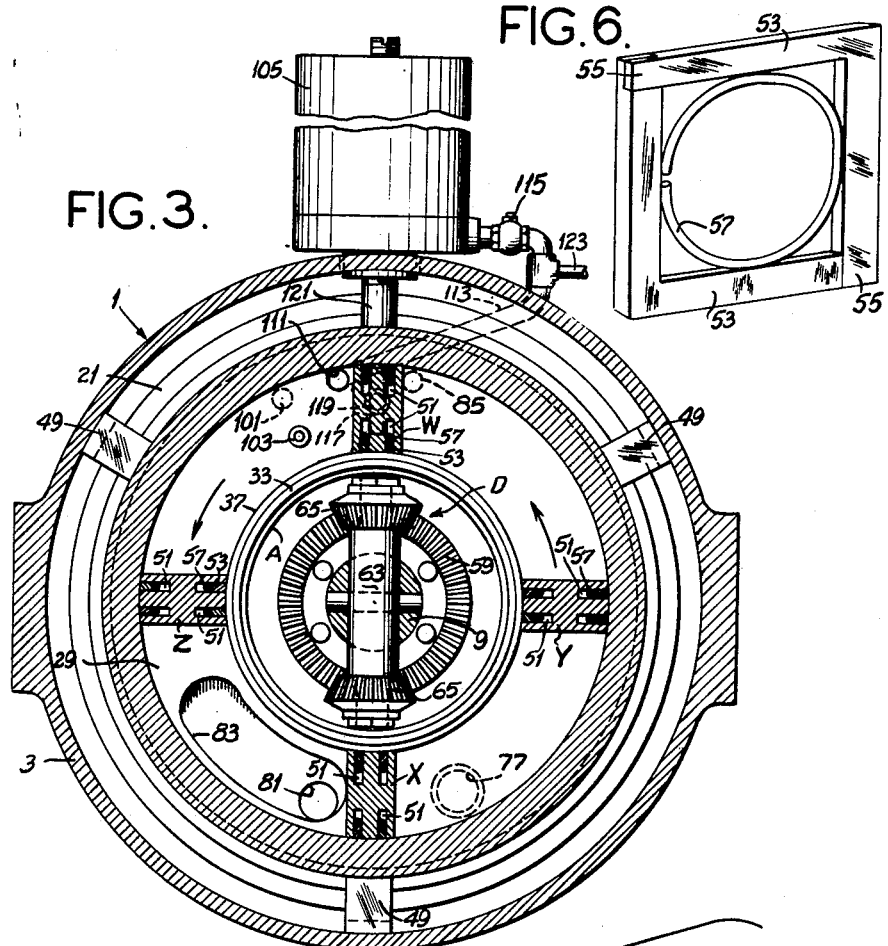
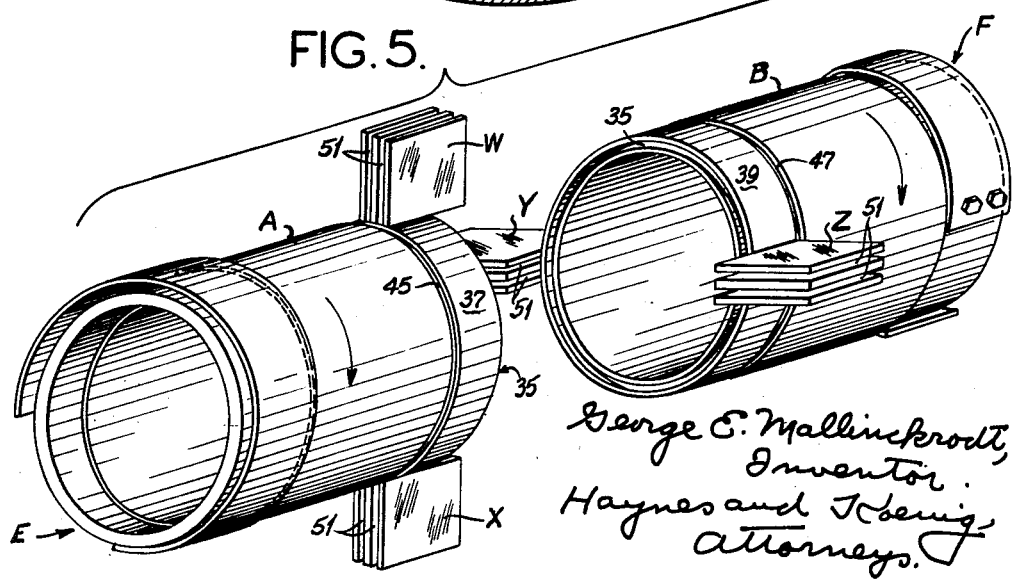
George E. Mallinckrodt,
Inventor.
Haynes and Koenig
Attorneys.

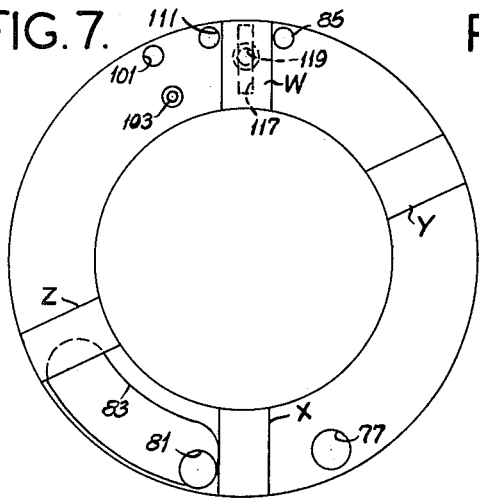
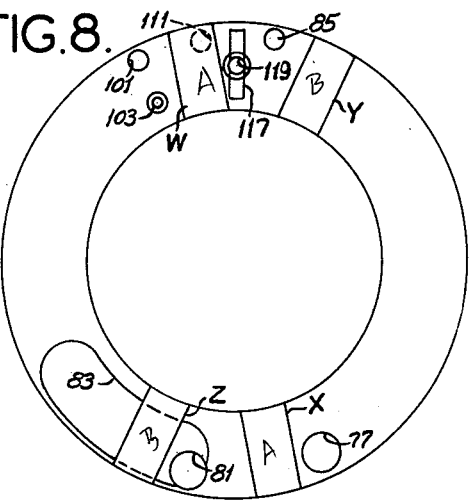
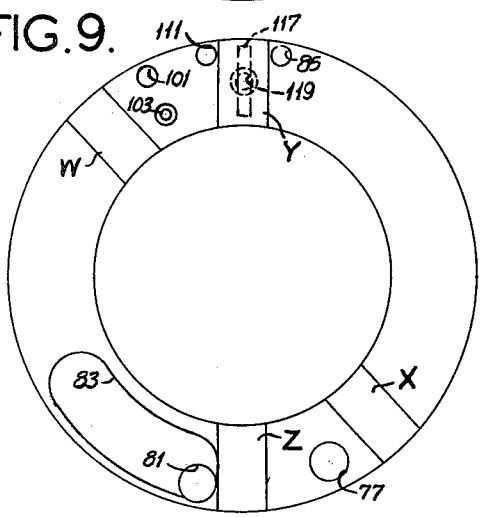
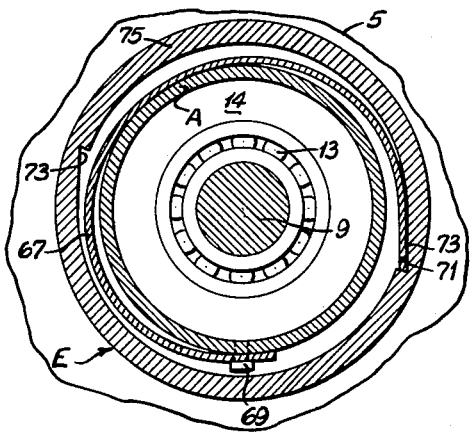
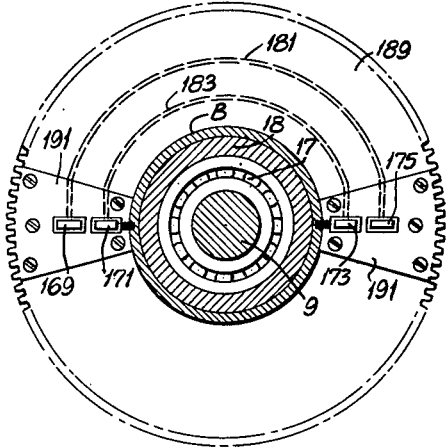

Aug. 31, 1954

G. E. MALLINCKRODT 2,687,609

ROTARY EXPANSION ENGINE

Filed Sept. 8, 1950

George E. Mallinckrodt,
Inventor.
Haynes and Koenig,
Attorney.

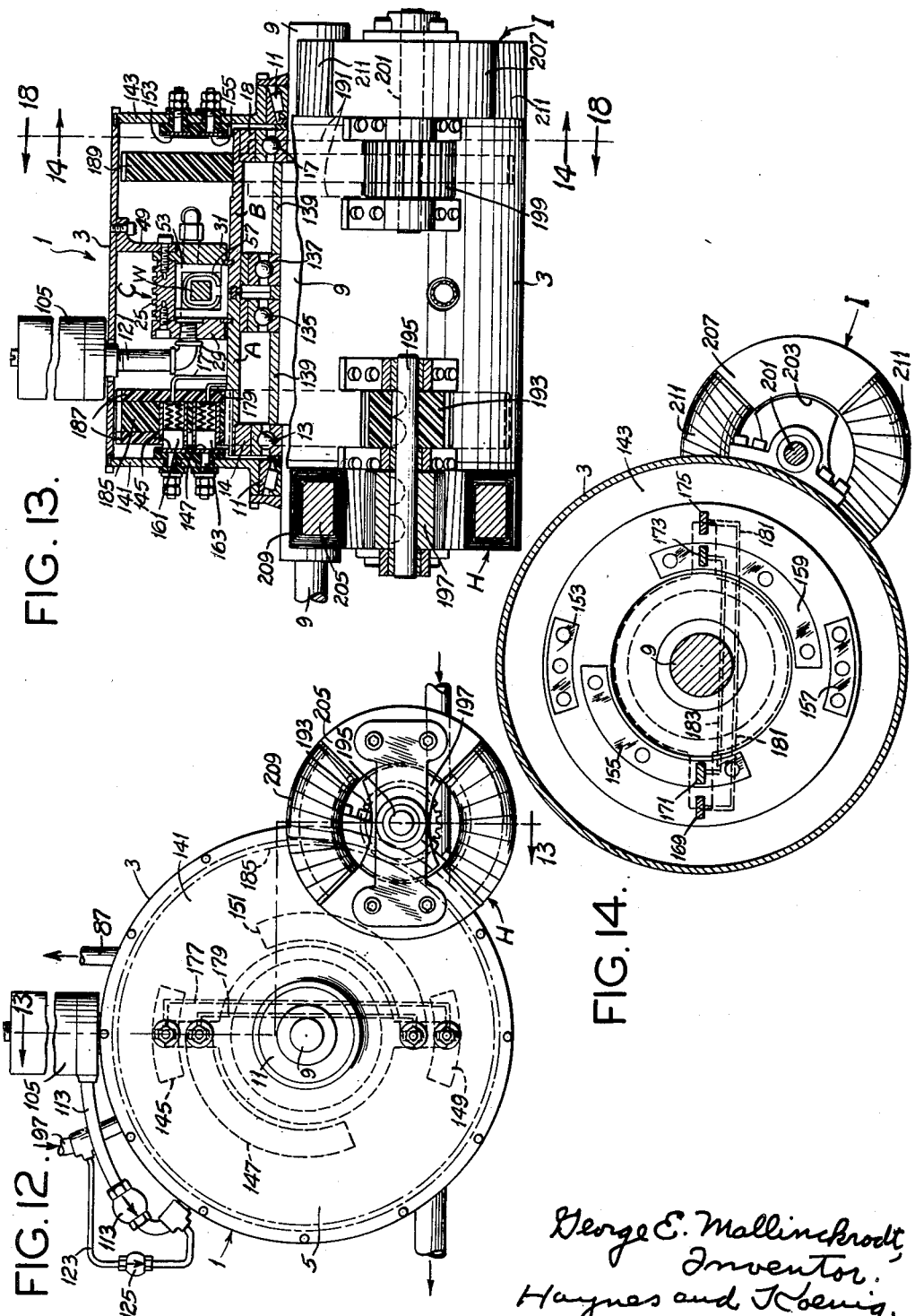

Aug. 31, 1954  G. E. MALLINCKRODT  2,687,609
ROTARY EXPANSION ENGINE
Filed Sept. 8, 1950  6 Sheets-Sheet 6

George E. Mallinckrodt,
Inventor.
Haynes and Koenig,
Attorneys.

Patented Aug. 31, 1954

2,687,609

UNITED STATES PATENT OFFICE 2,687,609

ROTARY EXPANSION ENGINE

George E. Mallinckrodt, St. Louis, Mo.

Application September 8, 1950, Serial No. 183,846

17 Claims. (Cl. 60—16)

This invention relates to rotary expansion engines capable of operating with expansive gas or vapor mediums such as hydrocarbon mixtures, air, steam, etc. and employing multiple rotors having opposed pistons alternately positioned in a toroidal cylinder. It is an improvement upon the type of construction disclosed in United States Patent 2,373,791, dated April 17, 1945.

Briefly, the invention consists in means for improving the performance of a rotary engine of the stated class by use of an accumulator which improves the mode of transfer of momentum from one rotor to another and permits the compression ratio, and hence the efficiency, to increase with increase of speed. The invention also incorporates more effective means for transmitting impulses from the rotors to the drive shaft. In certain forms of the invention this transmission is accomplished either by a uniquely employed differential gear, or by means of mechanical clutches. In another form of the invention this is accomplished by means of gear reduction means between the rotary magnetic holding elements and the rotors. An improved ignition system is also used, which requires no timing system per se. Other improvements and advantages will appear below.

The invention comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is an external view of one form of the invention;

Fig. 3 is a cross section taken on line 3—3 of Fig. 2 showing certain piston mid positions;

Fig. 4 is a cross section taken on line 4—4 of Fig. 2, illustrating one of two identical one-way clutches;

Fig. 5 is an exploded isometric view of two rotors removed from the engine;

Fig. 6 is an isometric detail, on an enlarged scale, illustrating certain piston seals;

Figs. 7-9 are diagrammatic views of the pistons at various positions developed throughout a cycle of action beginning with the position shown in Fig. 2;

Fig. 12 is an end view of an alternative magnetic lock type of the invention;

Fig. 13 is a vertical section taken on line 13—13 of Fig. 12;

Fig. 14 is a cross section taken on line 14—14 of Fig. 13;

Similar reference characters indicate corresponding parts throughout the several views of the drawings.

Figure 1:
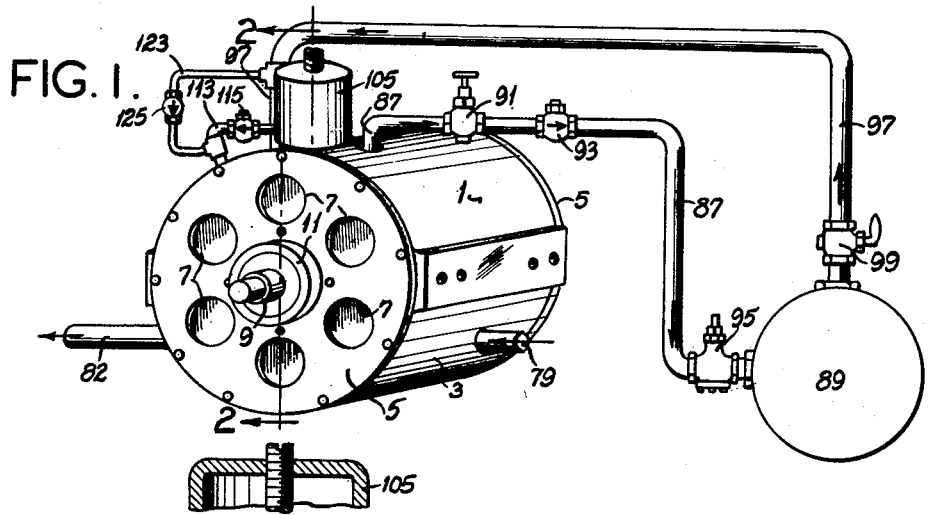

Referring now more particularly to Figs. 1-6 (showing a first embodiment of the invention), there is shown at numeral 1 a case or frame consisting of a drum 3 and end members 5, the latter containing air passages 7. The case 1 supports a rotary power shaft 9 in end bearings 11. Supported in a rotary manner is a rotor A around the left end of power shaft 9 and a rotor B around the right end of power shaft 9. Rotor A is carried upon bearings 13 within rings 14 and 15, both of which rings are attached within rotor A. Rotor B is carried upon bearings 17 within rings 18 and 19, both of which rings are attached within rotor B. Flywheels 21 and 23 are keyed to the rotors A and B, respectively.

Rotor A carries oppositely located plate-type pistons W and X; and rotor B carries oppositely located plate-type pistons Y and Z (see Fig. 5). The pistons W, X, Y and Z revolve in a toroidal or annular cylinder C of rectangular cross section. This cylinder C is comprised by an outer sleeve 25 on the exterior of which are air-cooling fins 27. Water cooling could be used at this point if desired. Bolted to the sleeve 25 are end plates 29 and 31, through which extend the adjacent ends 37 and 39 of the rotors A and B. These adjacent rotor ends 37 and 39 form the inside surface of the cylinder C.

Figure 2:
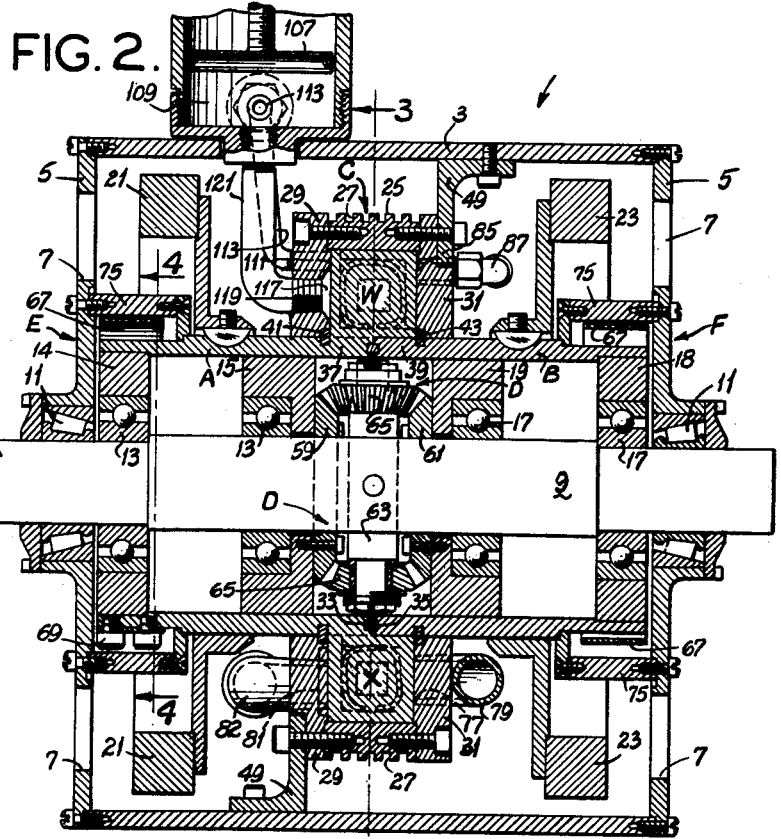
Fig. 2 is a longitudinal section taken on line 2—2 of Fig. 1.

The rotors A and B move relatively and therefore an intermediate brass or like sealing ring 33 is employed in connection with abutting grooves 35. A sealing ring 41 is employed between rotor A and plate 29, and a sealing ring 43 is employed between rotor B and plate 31. The grooves for this purpose on rotors A and B are shown at 45 and 47, respectively, in Fig. 5. The assembly of parts 25, 29 and 31 of cylinder C is supported upon internal lugs 49 carried within the case 1. The pistons W and X extend from end 37 of rotor A over the end 39 of rotor B. The pistons Y and Z extend from end 39 of rotor B over the end 37 of rotor A. Thus the pistons W and X on the one hand, and Y and Z on the other hand, interdigitate alternately within the cylinder C to track one another in said cylinder under relative motions of the rotors A and B. In order to provide a gas- or vapor-tight seal between each piston and the walls of cylinder C, the pistons are grooved as shown at 51 for the reception of slidable L-shaped sealing members 53 (see Figs. 5 and 6). These members 53 are provided with sliding mortises 55 to allow separating movements under action of an internal expansion spring 57, one being employed for each pair of sealing members 53. One pair of members and a spring are carried in each groove 51. The sealing members are not shown in Fig. 5 but they are shown in Figs. 2 and 6.

A driving connection is afforded between both of the rotors A and B on the one hand, and the shaft 9 on the other hand, by means of differential gearing indicated generally at D. This gearing consists of a bevel gear 59 rigidly connected with rotor A by bolting to ring 15. It also has a bevel gear 61 rigidly connected with rotor B by bolting to ring 19. Inserted at right angles in shaft 9 is a pin 63 which carries rotary pinions 65, each of which meshes with gears 59 and 61. If rotor A is held stationary and rotor B advances, gear 59 will be stationary and gear 61 will be rotated with rotor B. The pinions 65 will then be rolled on gear 59 by gear 61 and will drive the shaft 9 at half the speed of the rotor B. On the other hand, if rotor B is stationary and rotor A advances, gear 61 will be stationary and gear 59 will be rotated with rotor A. The pinions 65 will be rolled on gear 61 by gear 59 and will drive the shaft 9 at half the speed of the rotor A.

The moments of inertia of both rotors A and B, including attached parts, are equal. During operation of the engine at a given speed the sums of their angular velocities will remain the same, regardless of whether one rotor A or B is stationary or both of them are rotating. The purpose of the differential gearing D is under such conditions to deliver a substantially constant angular velocity to the shaft 9. As above noted, this angular velocity will be one-half of the maximum angular velocity of either rotor A or B when the other is stationary. When either rotor A or B decelerates, the other is accelerated (as will appear) but the same one-half angular velocity will still be delivered to shaft 9. Thus if rotor B delivers one-half of its angular momentum to rotor A, both will be moving at half the maximum speed of rotor B, and hence pinions 65 will roll on neither gear 59 nor 61 and the shaft 9 will not change its one-half speed. If both A and B are moving at different speeds (where the sum of the speeds remains constant), the differential gearing D will differentiate the movements to provide the original one-half speed for shaft 9. Further reasons for this appear below.

While a bevel gear type of differential gearing is shown, it will be understood that equivalent differential gearing may be carried out with other than bevel gears, as for example, an all-spur gear differential.

In order to confine the movements of rotors A and B to one direction (counterclockwise; Figs. 3 and 7–9), each is provided with a reverse locking ratchet, the ratchet for rotor A being indicated in general at E, and the ratchet for rotor B being indicated in general at F. While any of various forms of ratchets may be used, each is herein shown as comprising (Fig. 4) a spiral spring band 67, anchored at 69 to its respective rotor A or B. Each band wraps around the rotor for a little over 270° to its end 71. Oppositely located notches 73 in the stationary sleeves 75 are engageable by the respective band ends 71. Two notches are in each sleeve 75 in the same angular positions, that is they are axially opposite one another. The notches in each sleeve are 180° apart. The anchors 69 of the springs 67 to the rotors A and B are located 90° apart when the pistons W, X, Y, Z are located at the 90° intervals shown in Figs. 3 and 5. This places their ends 71 at 90° intervals under these conditions. The long extent of the spiral springs 67, when lubricant is contained within the sleeve 75, renders their operation quiet, and the springs are made heavy enough to withstand the reactive forces during power operation.

Referring to Figs. 1–3, numeral 77 indicates a suction port having an inlet passage 79 leading from a carburetor, mixing valve or other fuel-preparing device (not shown, since any suitable carburetor or the like may be used for internal combustion operation with gasoline, alcohol or the like). The position of port 77 is shown by dotted lines in Fig. 3. It is actually in plate 31, which is above the Fig. 3 section. At numeral 81 is shown an exhaust port with which is connected an arcuate pressure-release channel 83, sunk into the inner face of the ring 29. The exhaust port leads to an exhaust pipe 82.

At numeral 85 is shown a port in plate 31 which, through a pipe 87, connects with an air tank 89. The location of this port is also shown in dotted lines in Fig. 3. This pipe 87 includes a needle valve 91 for restricting the volume of flow to the tank 89, a check valve 93 opening toward the tank, and a pressure-relief valve 95 to limit the tank pressure. The tank has an outlet pipe 97 in which is a manual starting control valve 99. The pipe 97 connects with an air inlet port 101 in plate 31. The location of port 101 is also shown by dotted lines in Fig. 3. The purpose of this arrangement is to allow the machine to build up pressure in the tank 89 (through 85, 87, 91, 93 and 95) and to use this pressure for starting or running purposes at port 101, as will appear. Opposite the air inlet port 101 is an ignition plug 103 which is of the variety which maintains a constant igniting spark or temperature. For example, it may be a constantly arcing plug, a glow plug, or a so-called hot bulb, this plug at all times maintaining an igniting temperature.

At numeral 105 is shown an accumulator tank constituting a chamber, in which is an adjustable piston 107 for determining an adjustable confined accumulator space 109. There is a connection with this space 109 from the top of the cylinder C which consists of a slot 117 in the plate 29 leading through an outlet port 119 and a pipe 121, and connecting with the space 109. A return pipe 113 leads from the space 109 to an inlet port 111. Port 111 is shown solid in Fig. 3 because it is in plate 29. In the pipe 113 is a one-way connection (check valve) 115, opening away from the space 109 and toward the port 111. There is also a by-pass 123 from the air pipe 97 to the pipe 113 on the downstream side of the valve 115. This connection also contains a check valve 125 opening toward the port 111.

The starting operation on air is as follows, assuming that the tank 89 is initially charged with pressure, the valve 99 has been opened, the piston Z has reached the point in its power stroke shown in Fig. 3, and piston W is reverse-locked at the top by action of the reverse locking ratchet E.

Air flows through pipe 97 to port 101. It will be seen that if the piston Z at rest had been covering port 101 at the start, air would have passed from the starting pipe 97 through the by-pass 123, check valve 125 to port 111, to give the piston an initial push, to cock it into starting position beyond port 101. After passing port 101, it is accelerated by the entering air.

Piston Y is at this time receding from the inlet or suction port 77 and, being blocked off from exhaust port 81 by piston X, draws in a combustible charge. Any spent charge from a previous cycle of operation is pushed out of the exhaust 81 ahead of piston Z. The charge ahead of piston Y is compressed toward piston W. The locking of pistons W and X is performed by the expansive action of the charge between pistons W and Z, tending to push pistons W and X clockwise. However, pistons W and X are blocked by reason of clutch E being in the locked position shown in Fig. 4.

As piston Y approaches piston W, the intervening charge is compressed, a small amount being released through port 85 and needle valve 91 to maintain the pressure in tank 89. The needle valve 91 is adjusted to prevent a large amount of charge being used for this purpose. This action is demonstrated in Fig. 7. A short while after the Fig. 7 position, piston Z crosses port 83 and begins to release the working expansion pressure. This releases pistons W and X. The rotor B by this time has attained a substantial angular momentum (or kinetic energy). Upon release of pressure between pistons W and Z, this angular momentum (kinetic energy) is transferred from rotor B to rotor A (through the compressive charge between pistons W and Y). Piston W then moves to the position shown in Fig. 8, which uncovers the accumulator port 119. Thus a small part of the charge between pistons W and Y passes to the chamber 109 and is for an instant stored as potential energy. Thus some of the kinetic energy of rotor B is expended in charging 109, instead of passing immediately to the rotor A. This allows rotor B further to overtake rotor A, while piston W covers port 111 (Fig. 8). Then both pistons W and Y advance together, piston Y taking up the vertical position that piston W formerly assumed, as shown in Fig. 9. This cuts off port 119. By this time piston W has advanced to uncover the port 111, which readmits the charge previously introduced into chamber 109 by advancing piston Y. This readmission is behind piston W, delivering what was potential energy to piston W as kinetic energy. As piston W uncovers the air inlet port 101, a fresh charge of air is introduced and the cycle is repeated with rotors A and B interchanged in positions. At this time rotor B is locked against back rotation by clutch F. This state of affairs continues with the device operating essentially as an air engine, until the mixture introduced in port 77 reaches a concentration wherein under the cyclic action above described, the ignition plug 103 ignites the charges and then the air may be turned off at valve 99. The operation will then continue automatically, except that the charges between pistons as they cross the port 111 are explosive, and as these charges are brought over the plug 103, they explode with expansive action as already described.

In view of the above, it will be seen that the device will operate continuously either as an air engine if no carburetor is used on pipe 79, or as an internal combustion engine after air starting has been accomplished in the manner above indicated, assuming the carburetor to be attached to said pipe 79.

An important feature of the invention is the energy-accumulating action of the accumulator 105. If it were not for this accumulator it would not be possible for a trailing piston approaching the locking point at port 119 exactly to displace the leading piston at this point as the latter leaves its locked condition. Thus if there were not some relief of the compression between the upper pistons W and Y in the condition shown in Fig. 8, for example, piston Y would not assume the locked position displacing piston W, as shown in Fig. 9. Piston Y might stop short of this position. With the present design, the trailing piston can take up this locked position and then when the leading piston uncovers the port 111, as shown in Fig. 9, the potential energy which was stored in accumulator 105 by the trailing piston is reapplied to the leading piston. For example, in Fig. 9 this energy is being applied to the leading piston W by reason of movement of some compressed gas from the accumulator 105 through the check valve 115 to uncovered port 111. Thus complete transfer of momentum from one rotor to the other is delayed until the overtaking or trailing piston reaches its locking point, and after the accelerating piston has moved to uncover port 111. The resulting interchange of angular velocities between the two rotors A and B is always applied as a substantially constant velocity to the shaft 9 by the differential gearing D, regardless of whether one rotor A is stationary and the other moving; both rotors moving at the same velocity; or both rotors moving at different velocities, assuming a constant throttle opening in line 79 and constant fuel charge.

Another important feature of the invention is that, unlike the functions of ordinary reciprocating engines or even the rotary engine shown in said Patent 2,373,791, the compression ratio increases with increase in speed. Thus as the speed increases with throttle increase, the leading and overtaking pistons in their compressive action near port 119 more closely approach one another. Thus the thermodynamic efficiency increases at higher speeds. At a sufficient speed the heat of compression will result in a sufficient temperature to cause spontaneous ignition without the igniting effect of the plug 103, which under such circumstances can be turned off. However, it is desirable to limit this increase in compression ratio to an optimum value at the more useful speeds, and this may be accomplished by proper selection of the flywheel weights. A useful formula in this connection for internal combustion operation is as follows:

$$T = [1.47 \times 10^{-3}] \frac{I\omega^2}{h(R^2 - r^2)}$$

where

T is the temperature of the compressed charge in degrees centigrade;
I is the moment of inertia of one rotor system, including the flywheel in slug inches squared;
$\omega$ is the maximum angular velocity in R. P. M. of one rotor;

R is the radius in inches to the outside of a piston;
r is the radius in inches to the inside of a piston; and,
h is the width in inches of the pistons.

In regard to the provision for starting by air, it should be understood that this is not absolutely necessary, and that this could be accomplished by cranking the shaft 9, in which event the tank 89 and pipes 87, 97 and 123 would not be necessary. Thus in some clutch forms that may be used at E and F there is enough friction against forward movement to initiate the starting cyclic movement of the pistons upon turning the shaft 9 mechanically. Once the cycle of momentum interchange is initiated between the rotors A and B, the action of inspiration at the inlet 77, compression at 119, expansion and exhaust at 81 will continue the action automatically.

It will be observed that the volume of the accumulator 105 is adjustably variable by means of the adjustable piston 107, which allows for determining optimum operating conditions, so far as is concerned the above described accumulator action. It is inherent that the operation of the accumulator relieves pressure during the compression event which is bled off to the accumulator, the pressure being there stored for later use during the power stroke.

Figure 10:
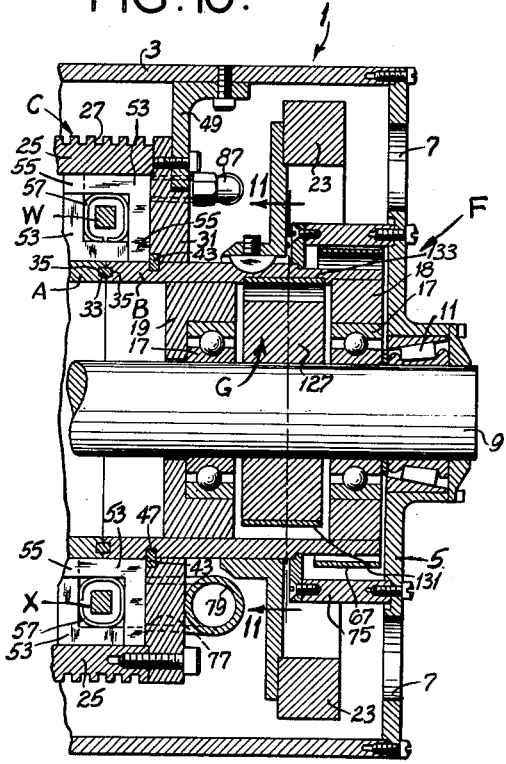
Fig. 10 is a fragmentary view of the right side of Fig. 2, but illustrating an alternative form of the invention.
Figure 11:
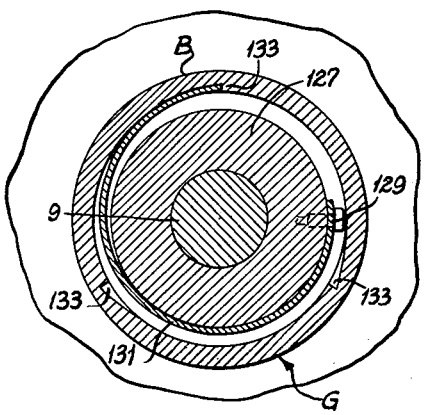
Fig. 11 is a cross section taken on line 11—11 of Fig. 10, showing one of two identical over-running clutches.

In Figs. 10 and 11 is shown another embodiment of the invention which is the same in all particulars to that already described in connection with Figs. 1–9, except that the differential gearing D is not employed for transmitting torque from the rotors A and B to the shaft 9. Since both ends of the apparatus as modified according to Figs. 10 and 11 are identical, only one end is shown in those figures. Also, a description of one end being the same as that of the other, only one description will be given. Referring therefore to Figs. 10 and 11, like reference characters designate like parts except for the removed differential gearing D, for which the following is substituted:

On each end of the shaft 9 is attached a flange 127 to which at 129 is anchored the coil spring 131 of an overrunning clutch G, the reverse locking notches of which are shown at 133. These notches are cut into the inside surface of the respective rotor A or B, rotor B being the one shown in Figs. 10 and 11. In this case, three notches are used in each rotor A or B, positioned around the adjacent flange 127 of the shaft 9. It will be noted that the clutch construction shown in Fig. 10 is placed in the available space in rotor B between bearings 17 (see also Fig. 2). It will be understood that the other clutch G not shown in Figs. 10 and 11 is to be located in the space within rotor A between bearings 13 (note Fig. 2). The clutches are symmetrical in form and position.

Operation of this form of the invention is the same as that already described, except that torque is delivered from rotor A or B to shaft 9 through the respective clutch G. For example, as shown in Fig. 11 in respect to rotor B, each time it moves counterclockwise it will drive a shaft 9 through the clutch G. As either rotor A or B slows up in transferring momentum to the other, its respective clutch G allows it to lag with respect to the shaft 9, which will then be driven by the other rotor. In view of the above, it will be seen that the only difference between the form of the invention shown in Figs. 1–9 and that shown in Figs. 10 and 11 is that the driving actions between the rotors A and B on the one hand, and shaft 9 on the other hand, are through the differential gearing D in Figs. 1–9 but through the clutches G in Figs. 10 and 11. The reaction to the case 1 is the same in each instance, namely, through clutches E and F.

In Figs. 12–17 is shown a form of the invention in which no differential, ratchet or clutch is used between the rotors, case and shaft, but instead a magnetic locking connection. This magnetic connection is an improvement upon that shown in said Patent 2,373,791. In the patent the magnetic connections are made by means of commutating magnetic brakes, the field members of which are attached to the case and the inductor members of which are attached directly to the drive shaft without any intermediate torque multiplying gears. The present improved embodiment in this respect consists in gearing down the connections between the brake members and the rotors. The inductor members by reason of the torque multiplying gears have an increased mechanical advantage with respect to the rotors, so that they can be more positively held in the desired locked positions against power induced reactions. The resulting construction is much lighter.

Like reference numerals are used in Figs. 12–17 so far as they are applicable, and new ones are employed where changes are indicated. The organization between the rotors A and B with the annular cylinder C are the same within the case 1, the same drum 3 being used. The end bearings 13 and 17 are the same between the rotors A and B, respectively, and the shaft 9. The inner bearings 135 and 137 are different but perform the same functions as the inner bearings 13 and 17 in Fig. 2. They are spaced by means of spacing sleeves 139 from bearings 18 and 17, respectively. The end members of the case are different, as indicated at 141 and 143. This is for the purpose of supporting insulated commutating segments 145, 147, 149 and 151 on end member 141. On end member 143 are similar insulated segments 153, 155, 157 and 159. On each rotor A and B are four brushes (161, 163, 165 and 167 in connection with the segments on end member 141; and 169, 171, 173 and 175 in connection with the segments on end member 143). The outer brushes 161 and 167 are electrically connected by a bus 177. The inner brushes 163 and 165 are connected by a bus 179. The brush 169 is electrically connected to the brush 175 by a bus 181, while brush 171 is connected to 173 by a bus 183. Brushes 161, 163, 165 and 167 are carried in an insulated manner in a gear 185 attached to rotor A, having segmental shrouds 187. Brushes 169, 171 and 175 are carried in an insulated manner in a gear 189 attached to the rotor B. This gear has a segmental shroud 191. The character of the shrouds is better shown in connection with gear 189 in Fig. 18. They are similar on gear 185.

Gear 185 meshes with a pinion 193 carried upon a shaft 195 mounted externally of the case 1. Shaft 195 carries a bi-polar magnetic inductor brake rotor 197. Gear 189 meshes with pinion 199 carried on a shaft 201 mounted on the outside of the case 1 and carrying a bi-polar magnetic inductor brake rotor 203. A double-pole magnetic field member 205 surrounds rotor 197 and a double-pole field member 207 surrounds the rotor 203. The field member 205 carries field coils 209, and the field member 207 carries field coils 211. Each set of coils will hereafter be referred to in the singular. When either field coil 209 or 211 is excited, the respective field member 205 or 207 becomes polarized so as substantially to lock or brake its respective inductor rotor 197 or 203, as the case may be. Thus it will be seen that the gears 185 and 189 may be magnetically locked with a mechanical advantage between the locking or braking parts and the rotors A and B. The magnetic braking parts for rotor A will hereafter be referred to as a magnetic lock or brake H, and the parts for braking rotor B as a magnetic lock or brake I. The ratios of gears 185 to 193, and 189 to 199, respectively, are 5:1, giving these locking brakes H and I a mechanical advantage of 5:1. This also provides ten locking positions for either magnetic inductor 197 and 203 for one revolution of its respective rotor A or B.

The operation of the pistons in cylinder C of the Figs. 12–14 form of the invention is the same as already described in connection with the previously mentioned forms. The clutching and declutching of rotors A and B with respect to the case, being electromagnetic in this case, will be described in detail in connection with Figs. 15–17, in which the rotors A and B are indicated diagrammatically with their pistons W, X, Y and Z. Numeral 213 indicates an electrical power source (battery) for exciting field coils 209 and 211. Coil 209 is connected with segment 151 by wire 215, and coil 211 with segment 159 by wire 217. Segments 147 and 153 are connected by wire 219. Segments 145 and 155 are connected by wire 221. Wire 223 connects segment 149 with the power supply 213. Segment 157 is connected with the power supply by wire 225.

Figure 15:
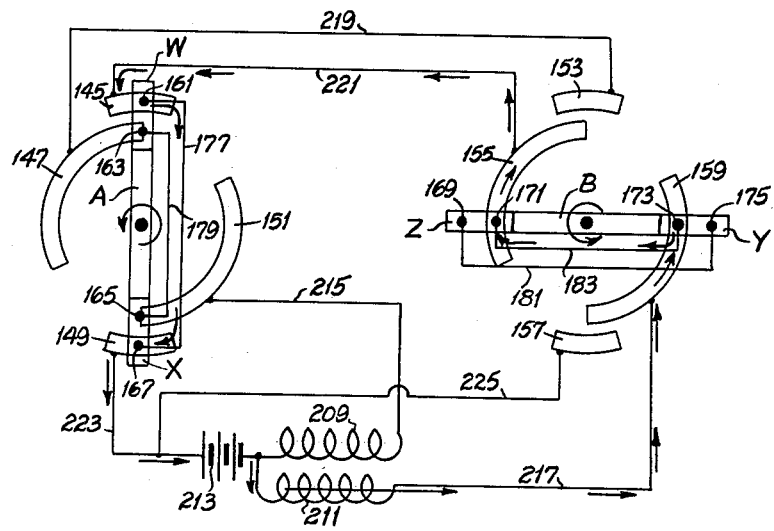

In Fig. 15 the rotor A is in a locked position with its pistons W and X vertical. Rotor B is being driven through the power stroke of piston Z, and piston Y is drawing in the charge. The solid arrows in Fig. 15 show how the brushes, segments, and wire connections are operative to excite coil 211, which is responsible for holding rotor A securely locked by reason of excitation of the electromagnetic brake H. Coil 209 of brake I is unexcited, so that B may rotate through its combined power and suction stroke. As soon as the brushes 171 and 173 of rotor B leave segments 155 and 159 (Fig. 16), at which time the exhaust event has started, coil 211 becomes deenergized and brake H released. Then the momentum of rotor B through the trapped charge between pistons Y and W is transmitted to then unlocked rotor A. This may be called the period of kinetic energy transfer between the rotors, which has been sufficiently described above. Note that during this period the coils 209 and 211 of both brakes H and I are unexcited and both brakes inoperative as such. Thus it will be clear that both rotors have free movement for transferring momentum from rotor B to rotor A, which accelerates by reason of the fact that piston Z has crossed the exhaust port, relieving the expansion pressure between pistons W and Z.

Figure 17:
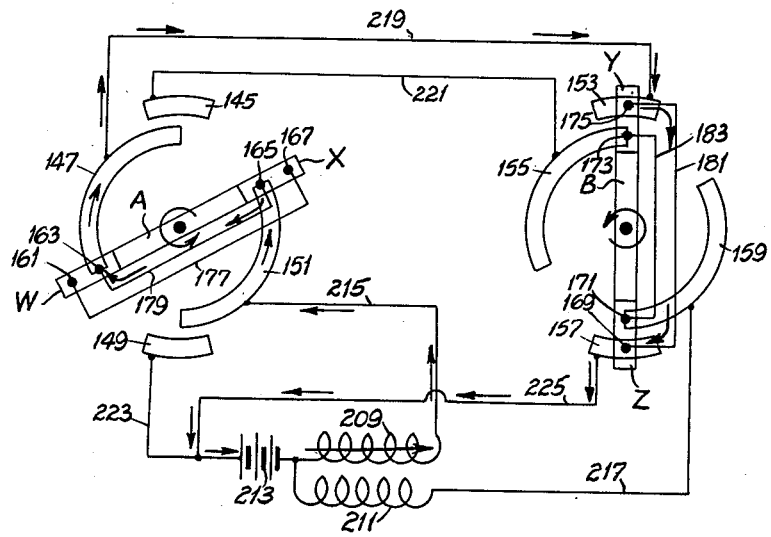

The next stage is shown in Fig. 17, wherein the rotor B has reached the vertical position of its pistons Y and Z. At this time the rotor A is passing through a power stroke of its piston W. The arrangement of brushes and segments is now such that the circuit shown by solid arrows in Fig. 17 excites coil 209 of brake I, which securely locks the rotor B. In Fig. 17 the brushes 163 and 165 of rotor A are about to break contact with the segments 147 and 151, the power stroke being about finished and the exhaust port about to be crossed by piston W. Thus one power stroke, one suction stroke and one energy interchange under compression between rotors A and B have occurred; and the action from then on is similar, except that rotor A is about to move into a position where the circuit to coil 209 will be broken. This will free rotor B, whereupon both rotors will again be mechanically free and the momentum of rotor A will be delivered to rotor B by reason of the compression charge between pistons X and Y. The two will then move in the same direction until rotor A becomes locked in its inverted position, with piston X forming the reaction to expansion of the charge between pistons X and Y. The condition of affairs then will be seen as shown in Fig. 15, except that the positions of pistons X and W will be interchanged, as well as the respective positions of pistons Z and Y. The complete cyclic action then continues indefinitely. In this form of the invention, the momentums of the brake rotors and associated gear trains are to be considered as supplying part of the total momentum interchanged between rotors. Hence flywheels as such are not necessarily required, but if the momentum of these rotors and trains is insufficient, additional flywheel weight may be added.

Figure 16:
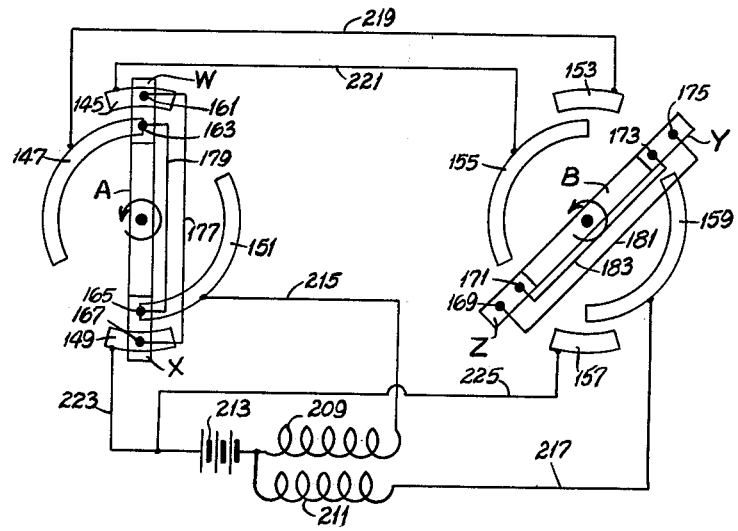
Figs. 15-17 are electrical diagrams showing successive operating positions of certain coil magnetizing timers; and, Fig. 18 is a cross section taken on line 18—18 of Fig. 13.

It will be noted from Figs. 15–17 that the segments 147, 151, 155 and 159 subtend an angle which is approximately the supplement of the angle subtended by the exhaust port 83. The exhaust port is best shown in Fig. 3, and it will be understod that the Figs. 12–14 form of the invention has the same design of a port. This means that at the end of each power stroke the circuits to both brakes are open, providing for free interchange of momentum between the rotors A and B. It will also be noted that there is a 5:1 gear ratio between rotors A and B and their respective brakes H and I. The brakes are of the two-pole variety adapted to lock at 180° intervals. Thus each brake inductor 197 and 203 will have its inductor in a horizontal position when a piston of its rotor is in top vertical locking position. Locking of each piston is assured as it comes into the top vertical position in which it is to act as a reaction point for the expanding charge.

As to all forms of this machine, there are no points of energy transfer between rotors involving shock, because during these energy-transfer periods both rotors are freely swinging and they are separated by a cushion of compressed gas which, moreover, is controlled by the accumulator 105. The compressive action of each piston gradually accelerates the piston ahead of it as it itself is decelerated, until it reaches its locking position. Also, the leading piston, after acceleration by the decelerated trailing piston, is already moving when ignition occurs by reason of exposure of the charge to the plug. This minimizes the liability to ignition knocks, particularly at high compression ratios at high speeds. Thus in the case of the present engine the compression ratio may be allowed to increase with speed to values greater than heretofore; and as is known, with increase in compression ratio the thermodynamic efficiency increases.

In view of the above, it will be seen that the several objects of the invention are achieved and other advantageous results attained.

As many changes could be made in the above constructions without departing from the scope of the invention, it is intended that all matter contained in the above description or shown in

I claim:

1. A rotary expansion engine comprising a toroidal cylinder, a pair of relatively movable pistons in the cylinder adapted successively to pass a predetermined reverse locking point, a pressure-relief port at said point, means responsive to expansion pressure of a working charge between the pistons for successively reverse locking the pistons as they reach said point, each of said pistons covering the relief port when reverse locked, each succeeding piston being adapted to approach and to compress a fresh charge against a reverse locked preceding piston, exhaust means for releasing the expansion pressure of the working charge to release a reverse locked piston, whereby both pistons with an intervening fresh charge may move together across said point to expose said pressure-relief port for relief of some of said fresh charge from between pistons to permit the succeeding compressing piston to advance further upon the preceding released piston so that the former may positively assume the locked position of the latter and whereby the compression pressure of the engine may increase with its speed.

2. Apparatus made according to claim 1, wherein said relief port is connected with an accumulator chamber having a one-way connection back to the cylinder at a point beyond the reverse locking point in the direction of piston movement, whereby the kinetic energy given up to potential energy by the succeeding piston during relief is returned as kinetic energy to said preceding piston upon working expansion.

3. Apparatus made according to claim 1, wherein said cylinder contains a continuous ignition device at a point in the direction of piston movement beyond said reverse locking position.

4. Apparatus made according to claim 1, wherein said relief port is connected with an accumulator chamber having a one-way connection back to the cylinder at a point beyond the reverse locking point in the direction of piston movement, whereby the kinetic energy given up to potential energy by the succeeding piston during relief is returned as kinetic energy to said preceding piston upon working expansion, and wherein said cylinder contains a continuous ignition device at a point in the directinon of movement beyond said reverse locking position.

5. A rotary engine comprising a power shaft, a cylinder surrounding said shaft and having an inlet port, relatively movable rotors respectively carrying opposite pistons alternately positioned in said cylinder, means responsive to working pressure for temporarily reverse locking successive pistons at a given position in the cylinder to apply power strokes to preceding pistons, each successive piston passing the inlet port being adapted to compress a charge against the preceding locked piston, the cylinder having an exhaust port adapted to relieve the working pressure of power strokes, whereby each reverse locked piston moves to working position followed by a closely succeeding piston, an accumulator chamber having an inlet connection with the cylinder adjacent the locking point of the pistons and covered thereby when locked, said chamber having a one-way connection with a succeeding point in the cylinder to permit said succeeding piston to advance upon its unlocked preceding piston and to assume its locking position, the arrangement being such that after some movement of said preceding piston the charge is admitted behind it, and means for connecting the rotors to the power shaft.

6. In a rotary engine a toroidal cylinder, relatively movable pairs of pistons in the cylinder successively passing a predetermined reverse locking point, means for successively reverse locking the pistons as they reach said point and for unlocking them thereafter, succeeding pistons compressing fresh charges against said pistons when reverse locked, said fresh charges moving the reverse locked pistons, whereby the charge between pistons is carried across said point to a working position, and an air starter tank having a first supply connection with the cylinder substantially beyond the reverse locking point, said tank having a second supply connection with the cylinder at a smaller distance beyond said point and having a return connection from the cylinder ahead of the reverse locking point.

7. In a rotary engine a toroidal cylinder, relatively movable pairs of pistons in the cylinder successively passing a predetermined reverse locking point, means for successively reverse locking the pistons as they reach said point and for unlocking them thereafter, succeeding pistons compressing fresh charges against said pistons when reverse locked, said fresh charges moving the reverse locked pistons, whereby the charge between pistons is carried across said point to a working position, an air starter tank having a supply connection to the cylinder beyond the reverse locking point and having a return connection from the cylinder ahead of the reverse locking point, a pressure-relief port at the reverse locking point adapted to be covered by a locked piston but uncovered when the piston advances, and an accumulator chamber with which said relief port is connected, said chamber having a one-way connection back to said cylinder at a point in the direction of movement beyond the reverse locking point, said cylinder containing a continuous ignition device at a point also in the direction of movement beyond said reverse locking position.

8. In a rotary engine a frame, a rotary power shaft in the frame, a toroidal cylinder attached to said frame, relatively movable rotors, pairs of pistons carried respectively by said rotors and alternately movable in said cylinder, a magnetic brake for each rotor, each magnetic brake comprising a field member fixed with respect to the frame and a rotary inductor adapted to be braked by the field member, and speed-reduction means between each rotary inductor and its respective rotor.

9. Apparatus made according to claim 8, including an electric circuit for individually exciting said field members, said circuit including timing means powered by the respective rotors adapted sequentially to excite and deexcite said field members so as temporarily to lock each piston successively in a predetermined position in said cylinder.

10. In a rotary engine a frame, a rotary power shaft in the frame, a toroidal cylinder attached to said frame, relatively movable rotors, pairs of pistons carried respectively by said rotors and alternately movable in said cylinder, a magnetic brake for each rotor, each magnetic brake comprising a field member, and a rotary inductor adapted to be braked, speed-reduction gearing between each rotary inductor and its respective rotor, an electric circuit for individually exciting said field members, said circuit including individual timing means driven directly by the respective rotors sequentially to excite and deexcite said field members once in a predetermined number of rotor revolutions greater than one so as to lock each piston successively once in a predetermined position in said cylinder per revolution of its respective rotor.

11. A rotary engine comprising a power shaft, a toroidal cylinder surrounding said shaft and having an inlet port, and having an exhaust port adapted to relieve the working pressure of power events, relatively movable rotors respectively carrying opposite pistons alternately positioned in said cylinder, means responsive to working pressure for temporarily reverse locking successive pistons at a given position in the cylinder to apply power to preceding pistons, each successive piston passing the inlet port compressing a charge against the preceding locked piston to provide a compression event, an accumulator chamber having an inlet connection with the cylinder at a point which is subjected to pressure of the charge during a compression event whereby pressure is relieved during said compression event, said chamber having a one-way connection with a point in the cylinder which is subject to the power event, whereby after some movement of a locked preceding piston beyond its locking position some of the relieved charge is admitted behind it from the chamber, and means for connecting the rotors to the power shaft.

12. In a rotary machine of the class described, a toroidal cylinder, relatively movable pairs of pistons in the cylinder successively approaching and receding from a predetermined holding point beyond which working pressure occurs and behind which compression pressure occurs, means for substantially holding the pistons against excess of working pressure over compression pressure as they reach said point and for thereafter releasing them for recession in response to excess of compression pressure over working pressure, succeeding pistons compressing fresh charges against preceding pistons when held, said fresh charges recessively moving the pistons so as to carry the charge between pistons across the holding point to a working position, and a by-pass connection arranged in the cylinder from said holding point to another point in the cylinder which is beyond the holding point and is located in the region of said working pressure.

13. Apparatus made according to claim 12, wherein the by-pass connection at the holding point is covered by each of the pistons as it successively assumes a position at the holding point and is uncovered as the pistons recede therefrom.

14. Apparatus made according to claim 13, wherein each race in the frame has two notches and each race on a rotor has three notches.

15. In a rotary machine of the class described, a frame, a toroidal cylinder carried by the frame, a power shaft, a pair of rotors each having more than one piston in the cylinder, the pistons on the respective rotors being relatively movable in the cylinder, a reverse locking clutch between each rotor and the frame consisting of an annular race fixed with respect to the frame and having a plurality of notches therein corresponding in number to the number of pistons on the respective rotor and each clutch having a ratchet member anchored to its respective rotor and having a relatively free end engageable with its notches, a driving clutch between each rotor and the shaft consisting of an annular race attached to the respective rotor having a plurality of notches therein in number at least one greater than the number of notches in said reverse locking clutches and each driving clutch having a ratchet member anchored to the shaft and having a relatively free end engageable with its notches.

16. In a rotary machine of the class described, a frame, a toroidal cylinder carried by the frame, a power shaft, a pair of rotors each having at least one pair of pistons in the cylinder, the pairs of pistons on the respective rotors being relatively movable in the cylinder, a reverse locking clutch between each rotor and the frame consisting of an annular race attached to the frame having a plurality of notches therein corresponding in number and spacing to the number of pistons on the respective rotor and each clutch having a ratchet member anchored to its respective rotor and having a relatively free end successively engageable with its notches, a forward driving clutch between each rotor and the shaft consisting of an annular race attached to the respective rotor, each race having a plurality of notches therein in number at least one greater than the number of clutches in said reverse locking clutches and each driving clutch having a ratchet member anchored to the shaft and having a relatively free end successively engageable with its notches.

17. In a rotary engine a toroidal cylinder, relatively movable pairs of pistons in the cylinder successively passing a predetermined reverse locking point, means for successively reverse locking the pistons as they reach said point and for unlocking them thereafter, succeeding pistons compressing fresh charges against said pistons when reverse locked, said fresh charges moving the reverse locked pistons, whereby the charge between pistons is carried across said point to a working position, an air starter tank having a supply connection to the cylinder beyond the reverse locking point, and a pressure-relief port adjacent the reverse locking point adapted to be covered by a locked piston but exposed when said piston moves from said point, whereby a compressing piston may advance upon the released piston as the charge between them traverses said point to the extent that the former may assume the locked position of the latter and whereby the compression pressure increases with speed.

References Cited in the file of this patent

UNITED STATES PATENTS

| Number | Name | Date |
|---|---|---|
| 746,870 | McCahon | Dec. 15, 1903 |
| 987,929 | Thomas | Mar. 28, 1911 |
| 1,024,166 | Weed | Apr. 23, 1912 |
| 1,086,175 | Hofmann | Feb. 3, 1914 |
| 1,425,900 | Rundell | Aug. 15, 1922 |
| 1,762,799 | Starkey | June 10, 1930 |
| 1,790,534 | Chevallier et al. | Jan. 27, 1931 |
| 2,061,827 | Brooks | Nov. 24, 1936 |
| 2,088,779 | English | Aug. 3, 1937 |
| 2,280,967 | Nelson | Apr. 28, 1942 |
| 2,373,791 | Stewart | Apr. 17, 1945 |

FOREIGN PATENTS

| Number | Country | Date |
|---|---|---|
| 22,656 | Great Britain | Oct. 20, 1904 |